(12) United States Patent
Dahlman et al.

(10) Patent No.: US 9,360,050 B2
(45) Date of Patent: Jun. 7, 2016

(54) BEARING RING AND A METHOD FOR ITS MANUFACTURING

(75) Inventors: Patrik Dahlman, Partille (SE); Baozhu Liang, Dittelbrunn (DE)

(73) Assignee: AKTIEBOLAGET SKF, Gothenburg (SE)

( * ) Notice: Subject to any disclaimer, the term of this patent is extended or adjusted under 35 U.S.C. 154(b) by 452 days.

(21) Appl. No.: 13/807,937

(22) PCT Filed: May 27, 2011

(86) PCT No.: PCT/SE2011/000096
§ 371 (c)(1),
(2), (4) Date: Jan. 2, 2013

(87) PCT Pub. No.: WO2012/002865
PCT Pub. Date: Jan. 5, 2012

(65) Prior Publication Data
US 2013/0101246 A1    Apr. 25, 2013

(30) Foreign Application Priority Data

Jul. 2, 2010  (SE) ....................................... 1000716

(51) Int. Cl.
| B23K 11/04 | (2006.01) |
| F16C 33/64 | (2006.01) |
| F16C 19/00 | (2006.01) |
| F16H 55/17 | (2006.01) |

(Continued)

(52) U.S. Cl.
CPC ................. *F16C 33/64* (2013.01); *B23K 11/04* (2013.01); *B23P 15/003* (2013.01); *B23P 15/14* (2013.01); *F16C 19/00* (2013.01); *F16C 33/581* (2013.01); *F16H 55/17* (2013.01); *F16H 57/00* (2013.01); *B23K 2201/30* (2013.01);

(Continued)

(58) Field of Classification Search
CPC ........ F16C 33/64; F16C 19/00; F16C 33/581; F16C 2226/36; F16C 2361/61; F16C 2220/44; B23P 15/003; B23P 15/14; F16H 57/00; F16H 55/17; B23K 11/04; B23K 2201/30; Y10T 29/49689; Y10T 29/49462; Y10T 29/53; Y10T 29/71; Y10T 29/72; Y10T 29/76; Y10T 29/81; Y10T 29/83; Y10T 29/49561; Y10T 29/65; Y10T 29/49636; Y10T 29/43; Y10T 29/68; Y10T 29/84; Y10T 29/89; Y10T 29/91

See application file for complete search history.

(56) References Cited

U.S. PATENT DOCUMENTS

| 1,967,821 A |   | 7/1934 | Hess |
| 3,229,353 A | * | 1/1966 | Morrison ................. 29/898.066 |

(Continued)

FOREIGN PATENT DOCUMENTS

| CN | 1233548 A | 11/1999 |
| CN | 1517239 A | 8/2004 |

(Continued)

*Primary Examiner* — Sarang Afzali
*Assistant Examiner* — Ruth G Hidalgo-Hernande
(74) *Attorney, Agent, or Firm* — Bryan Peckjian; SKF USA Inc. Patent Dept.

(57) ABSTRACT

A bearing ring (160, 260, 310, 410) exhibiting an inner (155, 255) and an outer (140, 240) periphery, also exhibiting a raceway (121, 221) for rolling elements on one of said peripheries, the bearing ring exhibiting a gear structure (131-138, 231-238) on one of said peripheries, as well as exhibiting at least one welding joint (151, 251). The welding joint has been formed by flash butt welding. Preferably, the gear structure (131-138, 231-238) and/or the raceway (121, 221) have been formed by rolling, machining or a combination thereof.

13 Claims, 3 Drawing Sheets

(51) Int. Cl.
*F16C 33/58* (2006.01)
*F16H 57/00* (2012.01)
*B23P 15/00* (2006.01)
*B23P 15/14* (2006.01)

(52) U.S. Cl.
CPC ........ *F16C 2220/44* (2013.01); *F16C 2226/36* (2013.01); *F16C 2361/61* (2013.01); *Y10T 29/49689* (2015.01)

(56) References Cited

U.S. PATENT DOCUMENTS

| | | |
|---|---|---|
| 3,387,900 A | 6/1968 | Morrison |
| 3,791,706 A | 2/1974 | Dobson |
| 6,334,713 B1 * | 1/2002 | Chu .............................. 384/464 |
| 2009/0158804 A1 * | 6/2009 | Jung et al. ................... 72/342.1 |

FOREIGN PATENT DOCUMENTS

| | | |
|---|---|---|
| FR | 2082718 A5 | 11/1971 |
| GB | 2214843 A | 8/1988 |
| JP | S61074966 A | 9/1984 |
| JP | H02095521 A | 9/1988 |
| JP | H01234619 A | 9/1989 |
| JP | H05177454 A | 7/1993 |
| JP | 2004183839 A | 7/2004 |
| WO | WO9932804 A1 * | 7/1999 |

* cited by examiner

BEARING RING AND A METHOD FOR ITS MANUFACTURING

CROSS-REFERENCE TO RELATED APPLICATION

This application is a National Stage application claiming the benefit of International Application Number PCT/SE2011/000096 filed on 27 May 2011, which claims the benefit of SE Application 1000716-9 Filed on 2 Jul. 2010.

TECHNICAL FIELD

The present invention discloses an improved bearing ring and methods for its manufacturing.

BACKGROUND

Rolling bearings are a common component in many fields of technology. A rolling bearing comprises an outer bearing ring, an inner bearing ring, and a number of rolling elements positioned in between the outer and the inner bearing rings. The inner and the outer bearing rings have a raceway for the rolling elements.

In some fields of technology, such as, for example, wind powered turbines, it is desired to equip at least one of the bearing rings of a rolling bearing with a gear structure. Examples of known methods of accomplishing this, i.e. to equip a bearing ring of a rolling bearing with a gear structure, comprise the following: attaching a gear structure to the outer or inner periphery of the bearing ring, or forming the gear structure on the periphery, outer or inner, of the bearing ring, by means of machining.

A drawback of the first method i.e. attaching a gear structure to a bearing ring is that the joint between the gear structure and the bearing ring to which it is attached will be weakened over time by such factors as stress, creeping, fretting corrosion and wear, which may eventually cause the joint to come apart. This drawback is particularly bothersome in applications in which large forces are present, such as, for example, the wind powered turbines mentioned before.

A drawback of the second method, i.e. machining a gear structure in the periphery, inner or outer, of a bearing ring, is that machining a gear structure inherently causes weaknesses in the structure.

A bearing ring, at least in the case of an outer ring, will inherently need to be a hollow ring, and a drawback of all of the methods mentioned above is that it is difficult to manufacture a hollow ring with a gear structure on its periphery with sufficient preciseness and quality both with regards to the gear structure and the bearing ring in its entirety.

SUMMARY

A purpose of the present invention is to provide a bearing ring with a gear structure on its periphery which does not exhibit the above mentioned drawbacks, and to also provide at least one method for manufacturing such a bearing ring.

This purpose is met by the present invention in that it discloses a bearing ring which exhibits an inner and an outer periphery, as well as exhibiting a raceway for rolling elements on one of its peripheries. In addition, the bearing ring of the invention exhibits a gear structure on the other of its peripheries, and furthermore exhibits a welding joint which has been formed by flash butt welding.

This is advantageous due to the fact that flash butt welding provides an exceptionally strong welding joint. In addition, due to the fact that the bearing ring of the invention exhibits at least one welding joint formed by flash butt welding, the gear structure and the raceway can be formed on opposite main surfaces of a straight steel bar, which is then bent to a ring shape and flash butt welded together. This means that, for example, the gear structure can be formed on or in the steel bar by means of standard gear manufacturing technologies, such as, for example, technologies used in the manufacturing of linear transmissions, which will result in lower costs and higher quality as compared to traditional methods of manufacturing gear structures on bearing rings.

In addition, the use of flash butt welding enables the use of steel with a higher carbon content than the steel used in traditional methods of manufacturing a bearing ring with a gear structure. Due to the fact that flash-butt welding is used, steel with a high carbon content, e.g. in excess of 0.67% can be used to manufacture the bearing ring of the invention, which means that the bearing ring of the invention may be stronger than traditional such bearing rings with gear structure, or it may be comparable in quality and performance but to a lower cost.

In one embodiment of the invention, the gear structure and/or the raceway has been formed by rolling, whilst, in another embodiment, the gear structure and/or the raceway has been formed by machining. In a further embodiment, the gear structure and/or the raceway has been formed by a combination of machining and rolling.

In one embodiment of the bearing ring, the gear structure is located on the outer periphery and the raceway on the inner periphery.

In one embodiment of the bearing ring, the gear structure is located on the inner periphery and the raceway on the outer periphery.

The gear structure comprises, in various embodiments, cogs or helical gears. The welding joint is, in one embodiment, located between two cogs or between two helical gears.

The invention also discloses a method for manufacturing a bearing ring, which comprises the following:

Forming a first gear structure on a first main surface of an elongated steel bar, Forming a raceway on a second main surface of the steel bar, with the second main surface being a surface which is opposite the first main surface, Bending the steel bar to form a ring, so that two opposing distal ends of the steel bar meet, Joining said two ends of the steel bar to each other by means of flash butt welding.

The invention also discloses a method for manufacturing a bearing ring, which comprises the following:

Forming a first gear structure on a first main surface of each of two or more elongated steel bars, Forming a raceway on a second main surface of each of two or more elongated steel bars, with the second main surface being a surface which is opposite the first main surface, Bending the two or more elongated steel bars so that they each form ring segments of a ring with a first radius, with the gear structure and the raceway of each elongated steel bar facing the same direction, inwards/outwards, of the ring segment, Joining ends of said two or more steel bars to each other by means of flash butt welding, in order to form a bearing ring with said first radius.

In one embodiment, the raceway and/or the gear structure is formed by means of rolling.

In one embodiment, the raceway and/or the gear structure is formed by means of machining.

In one embodiment, the raceway and/or the gear structure is formed by means of a combination of rolling and machining.

In one embodiment, the raceway and the gear structure are formed in the same operation.

In one embodiment of the method, the steel bar is bent to form a ring in such a manner that the gear structure faces outwards from an outer periphery of the ring and the raceway faces inwards from an inner periphery of the ring.

In one embodiment of the method, the steel bar is bent to form a ring in such a manner that the gear structure faces inwards from an inner periphery of the ring and the raceway faces outwards from an outer periphery of the ring.

In one embodiment of the method, the gear structure is formed to comprise cogs or helical gears. In one such embodiment, the gear structure or structures is/are formed to comprise an entire cog or helical gear adjacent to each end of the steel bar or bars, thus enabling the flash butt welding to be performed between two cogs or helical gears.

These and other embodiments of the invention, as well as advantages obtained by means of the invention will be described in the following text.

BRIEF DESCRIPTION OF THE DRAWINGS

The invention will be described in more detail in the following, with reference to the appended drawings, in which.

DETAILED DESCRIPTION

Figure 1A:
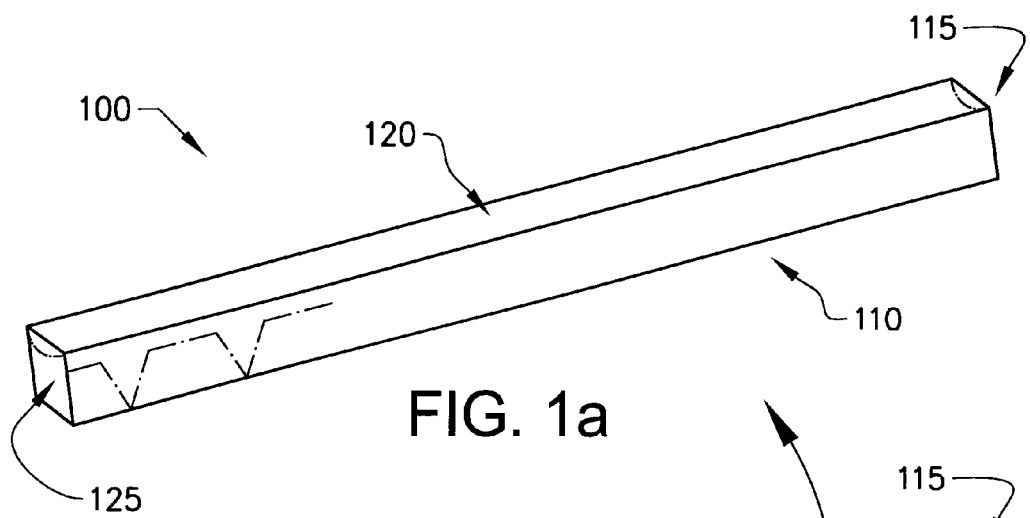
FIGS. 1a-1d show a first embodiment of the invention.
Figure 1B:
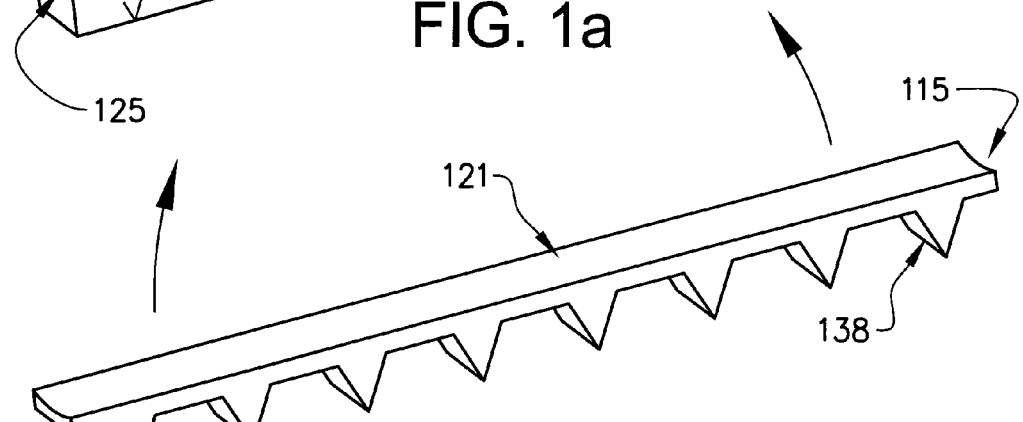
Figure 1C:
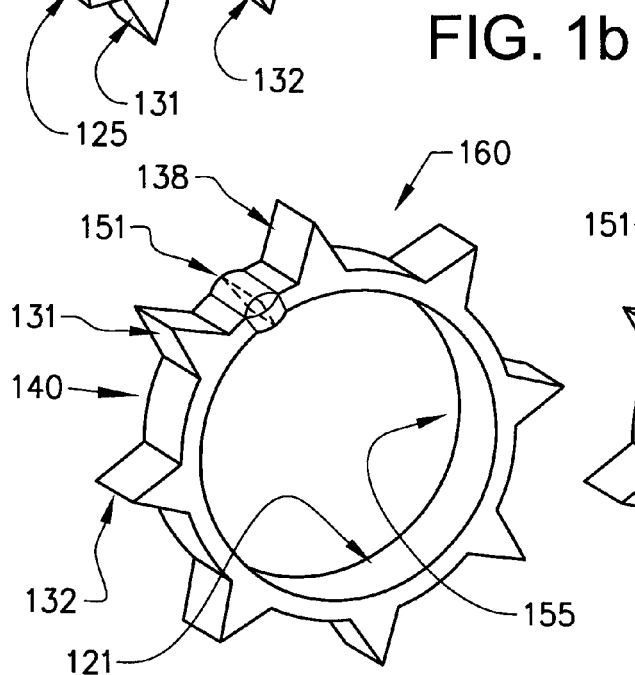
Figure 1D:
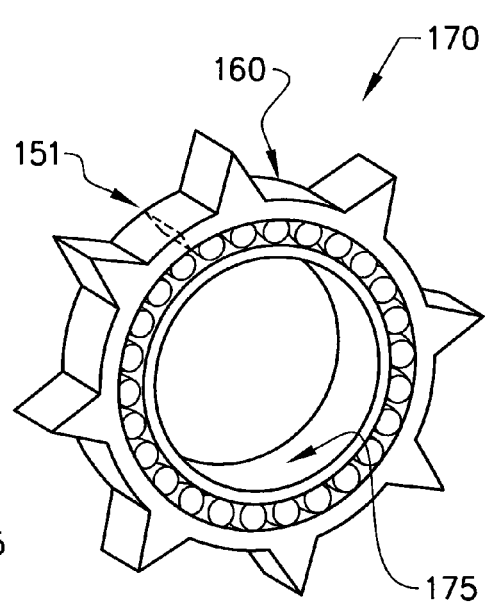

FIGS. 1a-1c show a method for obtaining a bearing ring of one embodiment of the invention, whilst FIG. 1d shows the bearing ring of the invention used as the outer bearing ring of a rolling bearing.

FIG. 1a shows an elongated steel bar 100 which exhibits a first 110 and a second 120 main surface, and two opposing distal ends 115, 125. Dashed lines in FIG. 1a outline a gear structure which will be formed on the first main surface 110 of the steel bar 100. In FIG. 1a, dashed lines on the opposing distal ends 115, 125, also show that a raceway for rolling elements will also be formed in the steel bar on the second main surface 120, which is a main surface that opposes the first main surface 110.

In one embodiment of the method of the invention, the gear structure and/or the raceway is formed by means of rolling.

In one embodiment of the method of the invention, the gear structure and/or the raceway is formed by means of machining.

In one embodiment of the method of the invention, the gear structure and/or the raceway is formed by means of a combination of machining and rolling.

These different ways of forming the gear structure and/or the raceway offer different advantages: Using rolling to form the gear structure and/or the raceway provides an exceptionally strong gear structure and/or raceway, due to the smooth and continuous material flow caused by rolling. Using machining to form the gear structure and/or the raceway is advantageous since the machining is performed on a steel bar, i.e. on a straight structure, as opposed to machining on the curved periphery of a ring, which makes the machining easier and thus less costly.

Suitably, the gear structure and the raceway are formed in the same operation.

The gear structure which is formed on the first main surface 110 can exhibit different forms and shapes, as will be elaborated upon later, but in the embodiment shown in FIGS. 1a-1d, the gear structure is formed to comprise cogs 131-138 shaped in the form of "teeth" i.e. protrusions with a pointed triangular structure, where the point faces away from the first main surface 110 of the steel bar on which the gear structure is located. Suitably, the cogs are spaced evenly on the main surface of the steel bar, and are separated by intermediate spaces.

Yet another advantage given by the invention is that, as shown in FIGS. 1a and 1b, the gear structure and the raceway are formed on plane surfaces of a straight steel bar, which is easier than forming a gear structure or a raceway on a ring shaped surface.

FIG. 1b shows the complete gear structure formed on the first main surface 110 of the steel bar 100, i.e. the cogs 131-138 interleaved with spaces. The raceway 121 is also shown.

As indicated by means of two arrows in FIG. 1b, the steel bar 110 will now be bent to form a ring, so that the two opposing distal ends 115, 125, of the steel bar 100 meet. The arrows of FIG. 1b indicate that the steel bar is bent in a direction which will cause the gear structure to face outwards from an outer periphery of the ring which is formed and the raceway 121 to be positioned on an inner periphery of the ring which is formed. In another embodiment of the invention, the steel bar is bent in the other direction, so that the gear structure faces inwards from an inner periphery of the ring which is formed, and the raceway 121 is positioned on an outer periphery of the ring which is formed.

Once the steel bar has been bent to the ring-shape, the two opposing distal ends 115, 125 are joined to each other by means of flash butt welding, so that a welding joint is formed in the ring. (For the sake of completeness, an example of how flash butt welding is performed will be given at the end of this text.)

FIG. 1c shows a hollow bearing ring 160. As can be seen from FIG. 1c, the hollow bearing ring 160 exhibits an outer 140 and an inner 155 periphery, and exhibits the gear structure on the outer periphery 140 and the raceway 121 on the inner periphery 155. The gear structure in this example comprises teeth shaped cogs 131-138, interleaved with spaces.

As can be seen in FIG. 1c, by means of the flash butt welding, a welding joint 151 is formed in the finished hollow bearing ring 160, suitably between two cogs 131, 138. Suitably, the welding joint is placed between two cogs in the following manner: the gear structure is formed to comprise an entire cog adjacent to each end of the steel bar or bars, thus enabling the flash butt welding to be performed between two cogs. Naturally, the invention also comprises embodiments in which the flash butt welding is performed in a cog or a helical gear, in which case one part of a cog or a helical gear is formed on each of those bar ends which are then joined together by means of flash butt welding, so that a complete cog or helical gear is formed after the two ends have been joined to each other by the flash butt welding.

FIG. 1d shows the hollow bearing ring 160 in position as the outer ring of a rolling bearing 170. As can be seen, the rolling bearing 170 also comprises an inner ring 175, and a number of rolling elements positioned in between the inner 175 and the outer ring 160, in a raceway in each of the rings. In FIG. 1d, the flash butt welding joint has been smoothened, which for example can be done by means of machining.

Figure 2A:
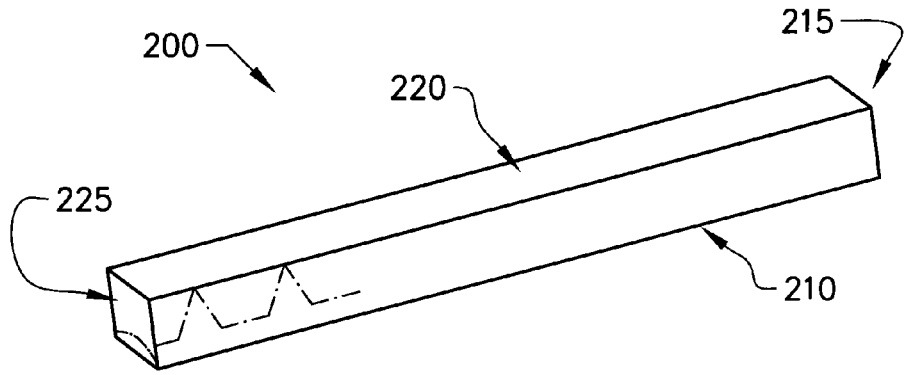
FIGS. 2a-2d shows a second embodiment of the invention.
Figure 2B:
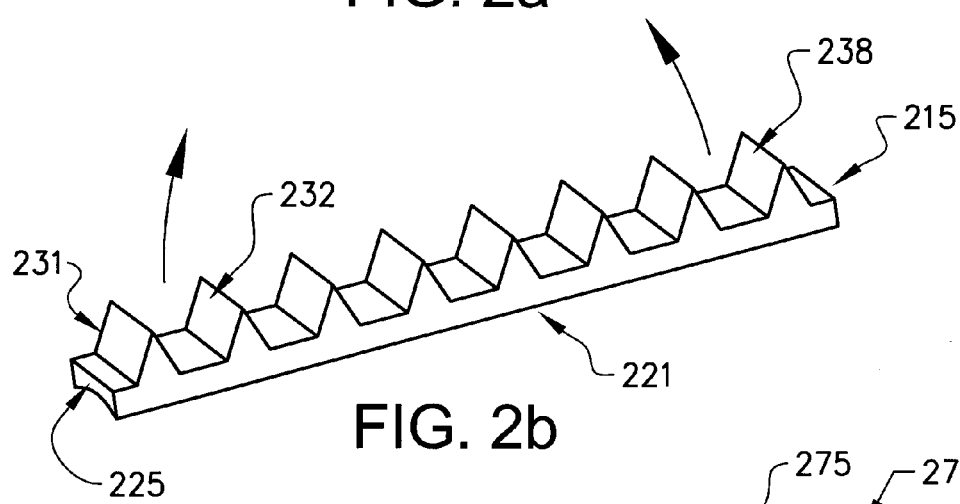
Figure 2C:
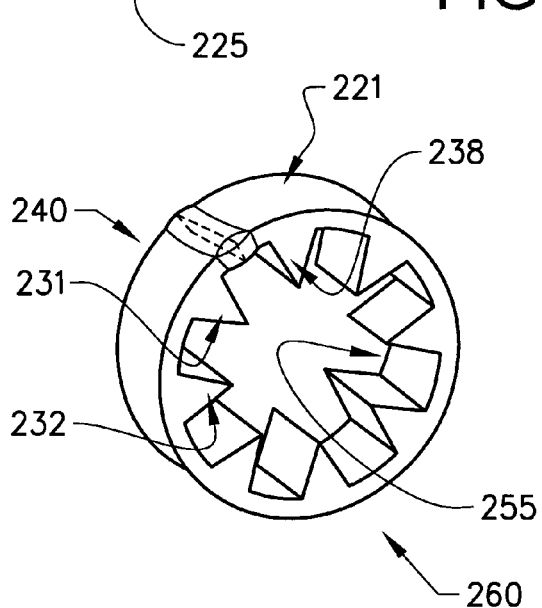
Figure 2D:
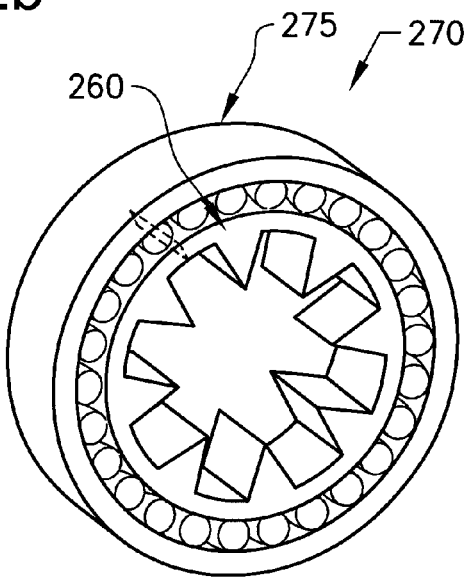

FIGS. 2a-2d show another embodiment both of the method of the invention and of the bearing ring 260 (shown in FIG. 2c) obtained by this embodiment, whilst FIG. 2d shows the hollow bearing ring 260 used in a rolling bearing 270: the method shown in FIGS. 2a-2c as well as the rolling bearing 270 shown in FIG. 2d will not be described in detail here due to the large similarity to that shown in FIGS. 1a-1d, but as can be seen, a gear structure (outlined by dashed lines in FIG. 2a) is formed on the second main surface 220 of a steel bar 200, and a raceway 221 (outlined by dashed lines in FIG. 2a) is formed on the first main surface 210 of the steel bar 200. Suitably, the gear structure and/or the raceway 221 is formed by means of rolling, machining or a combination thereof. In this embodiment, in similarity to the one shown in FIGS. #a-1d, the gear structure comprises teeth shaped cogs 231-238, interleaved with spaces.

Once the gear structure and raceway have been formed in the steel bar 200, as indicated by means of two arrows in FIG. 2b, the steel bar 200 is bent to a ring-shape, and the two opposing ends 215, 225 are joined to each other by means of flash butt welding, in the same manner as that described in connections with FIGS. 1a-1c. The bearing ring 260 which is obtained in this manner is thus similar to the one 160 of FIG. 1c, but with the difference that the gear structure faces inwards from the inner periphery 255 of the ring 260, and the raceway 221 faces outwards from the outer periphery 240 of the bearing ring 260.

Naturally, the embodiment 260 of FIG. 2c can also be obtained by forming the gear structure on the first main surface 210 of the steel bar 200, and then bending the steel bar in a direction opposite to that shown by means of the arrows in FIG. 2b.

FIG. 2d shows the bearing ring 260 in position as the inner ring of a rolling bearing 270. As can be seen, the rolling bearing 270 also comprises an outer ring 275, and a number of rolling elements positioned in between the inner ring 260 and the outer ring 275, in a raceway in each of the rings.

Figure 3:
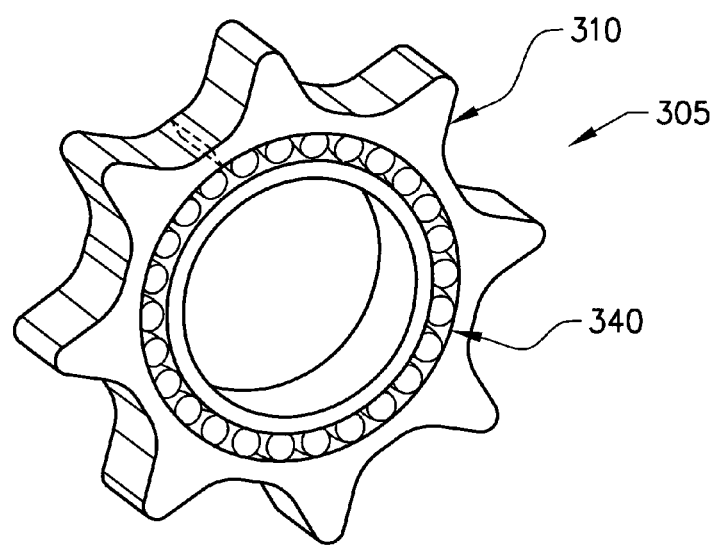
FIG. 3 shows a third embodiment of the invention.

As will be realized, the exact structure of the gear structure which is formed by means of rolling in a bearing ring can be varied in a wide variety of ways. FIG. 3 shows a third embodiment of a bearing ring 310 of the invention positioned as the outer ring of a rolling bearing 305. In this embodiment, the gear structure has been formed on the outer periphery 340 of the bearing ring 310, and is in the form of a structure with smooth protrusions which face away from the periphery of the bearing ring 310.

Figures 4, 5:
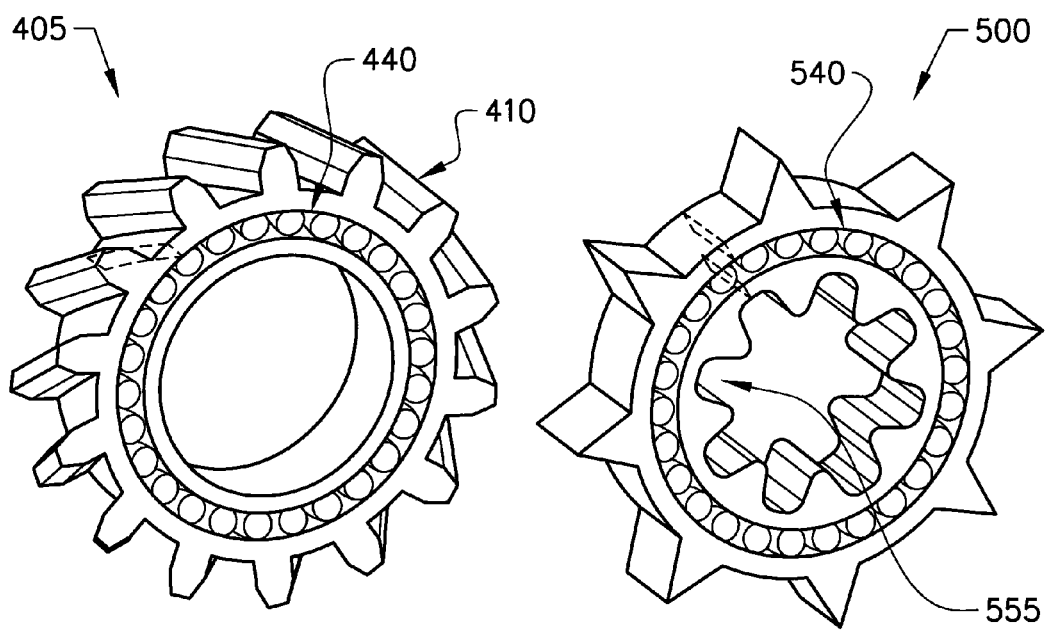
FIG. 4 shows a fourth embodiment of the invention.
FIG. 5 shows a fifth embodiment of the invention.

FIG. 4 shows a fourth embodiment of a bearing ring 410 of the invention positioned as the outer ring of a rolling bearing 405. In this embodiment, the gear structure has been formed on the outer periphery 440 of the bearing ring 410, and is in the form of helical gears. Suitably, in this embodiment, the welding joint is placed between two helical gears, which is accomplished in the following manner: the gear structure is formed to comprise an entire helical gear adjacent to each end of the steel bar or bars, thus enabling the flash butt welding to be performed between two helical gears, as opposed to being performed in the middle of a helical gear.

FIG. 5 shows yet a further embodiment 500 of the invention. In this embodiment, a gear structure is formed on both the outer periphery 540 of an outer gear ring, as well as on the inner periphery 555 of an inner gear ring. The embodiment 500 is obtained by means of combining the methods described in connection with FIGS. 1 and 2.

FIGS. 1 and 2 show a method for obtaining a bearing ring by means of using one contiguous steel bar. However, the invention also discloses a method for obtaining a bearing ring by means of using two or more steel bars, as follows:

Forming a first gear structure on a first main surface of each of two or more elongated steel bars, Forming a raceway on a second main surface of each of two or more elongated steel bars, with the second main surface being a surface which is opposite the first main surface, Bending the two or more elongated steel bars so that they each form ring segments of a ring with a first radius, with the gear structure and the raceway of each elongated steel bar facing the same direction, inwards/outwards, of the ring segment, Joining ends of the two or more steel bars to each other by means of flash butt welding, in order to form a bearing ring with said first radius.

Thus, this embodiment of the invention comprises using at least two steel bars which are bent and then joined together to form the bearing ring, the joining being done by means of flash butt welding. The two (or more) steel bars which are used can be of equal lengths, which means that they will form equal parts of the bearing ring, or they can be of differing lengths, so long as they are bent to the same radius, so that they form "circle segments" of differing angular lengths which fit together.

Apart from the fact that multiple steel bars are used in this embodiment, so that more flash butt welding joints will be formed, the features mentioned above for the embodiment in which one steel bar is used to form the bearing ring can be applied to this embodiment as well, e.g. the form and shape of the gear structure and the raceway as well as how the gear structure and the raceway is formed and where they are placed on the bearing ring.

The use of one or more circle segments to form a bearing ring of the invention can also be expressed in the following manner:

a first gear structure is formed on a first main surface of at least one elongated steel bar, a raceway is formed on a second main surface of the at least one elongated steel bar, with the second main surface being a surface which is opposite the first main surface, the at least one steel bar is bent so that it forms a circle segment of a circle with a first radius, ends of at least one steel bar are joined to each other by means of flash butt welding, in order to form a bearing ring with the first radius.

Thus, the circle segments mentioned here is either one circle segment of a complete (360 degree) circle, or portions of such a circle, which fit together to form a complete circle upon welding. Naturally, if more than one circle segment is used (i.e. each circle segment is less than 360 degrees), the surfaces on which the raceways and the gear structures are formed face in the same direction.

Flash butt welding has been mentioned in the description above, and a short description of one version of flash butt welding will be given in the following: The opposing distal ends of the steel bar, which have been brought to meet each other so that the steel bar is formed as a ring, are clamped between two dies, an upper and a lower die, where the upper die is in steel and the lower is in copper. The ends are brought together, and current is applied. An arc is thus created between the two mating surfaces, i.e. the surfaces of the two ends. At the beginning of the flash butt welding process, the arc gap is sufficiently large to even out and clean the two faces. Reducing and then closing and opening the gap creates heat in the two ends. When the temperature has reached the "forging" temperature, pressure is applied. A flash is created between the mating surfaces, which takes out potential impurities and defects from the welding area.

The invention is not limited to the examples of embodiments described above and shown in the drawings, but may be freely varied within the scope of the appended claims. In addition, it should be mentioned that certain kinds of gear structures which are formed by means of rolling can be enhanced, i.e. "finalized", by means of machining. However, any such machining will be minor in its nature, and thus any disadvantages caused to the material by machining will be minor or negligible.

It should also be mentioned that a bearing ring of the invention can be formed to fit a wide variety of rolling bearings apart from those shown in the drawings and described above, in which case the raceway, for example, can be shaped to fit such other types of rolling bearings. One alternative kind of rolling bearing which can be mentioned is the so called spherical rolling bearing, which has two rows of rollers with a common sphered raceway in the outer ring and two inner ring raceways inclined at an angle to the bearing axis. Other kinds of alternative rolling bearings for which a bearing ring of the invention include tapered, conical, cylindrical and toroidal rolling bearings, as well as ball bearings.

In addition, it should be made clear that although the invention has been described by means of a number of method embodiments, the invention also comprises the products, i.e. the bearing rings, obtained by those methods, as outlined in the patent claims. In addition, the invention also comprises a rolling bearing which comprises a bearing ring in any of the embodiments of the invention.

The invention claimed is:

1. A method for manufacturing a bearing ring, the method being characterized in that it comprises the following:
    forming a first gear structure on a first main surface of an elongated steel bar, 0.67%,
    forming a raceway on a second main surface of the elongated steel bar during the same operation that the forming of the first gear structure on the first main surface occurs such that the raceway and the first gear structure are formed at the same time, the raceway being configured to receive rolling elements such that the raceway is not engaged with another member that is non rollably positioned thereon, with the second main surface being a surface which is opposite the first main surface,
    bending the elongated steel bar to form a ring, so that two opposing distal ends of the elongated steel bar meet,
    joining said two ends of the elongated steel bar to each other by means of flash butt welding to form the bearing ring.

2. The method of claim 1, wherein the step of forming the raceway further comprises the raceway extending entirely across the second main surface of the elongated steel bar in an axial direction which is perpendicular to a direction of elongation of the elongated steel bar.

3. The method of claim 2, wherein the step of forming the raceway further comprises the raceway being arcuate and free of discontinuities in the axial direction.

4. The method of claim 1, according to which the first gear structure is formed to comprise at least one of cogs and helical profiles.

5. The method of claim 4, wherein the flash butt welding is performed between two sequential of the at least one of cogs or helical profiles.

6. A method of forming a bearing ring, comprising:
    providing an outer ring and an inner ring each formed using the method of claim 1 such that the first gear structure of the outer ring extends radially outwardly and such that the first gear structure of the inner ring extends radially inwardly; and
    providing a plurality of rolling members therebetween.

7. The method of claim 6, wherein the step of providing the outer ring and the inner ring further comprises the raceway on the outer ring and the raceway on the inner ring each extending entirely across the second main surface of the elongated steel bar in an axial direction.

8. The method of claim 1, further comprising at least one step selected from a group of fabrication steps, the fabrication steps group consisting of:
    forming at least one of the raceway and the first gear structure by a process of rolling, and
    forming at least one of the raceway and the first gear structure by a process of machining.

9. The method of claim 1, wherein the step of bending the elongated steel bar includes:
    bending the elongated steel bar such that the first gear structure faces outwards from an outer periphery of the ring and the raceway faces inwards from an inner periphery of the ring.

10. The method of claim 1, according to which the elongated steel bar is bent in such a manner that the first gear structure faces inwards from an inner periphery of the ring and the raceway faces outwards from an outer periphery of the ring.

11. A method for manufacturing a bearing ring, the method being characterized in that it comprises the following:
    forming a first gear structure on a first main surface of each of at least two elongated steel bars, the at least two elongated steel bars each having a carbon content greater than zero point six seven percent (0.67%),
    forming a raceway on a second main surface of each of the at least two elongated steel bars during the same operation that the forming of the first gear structure on the first main surface occurs such that the raceway and the first gear structure are formed at the same time, the raceway being configured to receive rolling elements such that the raceway is not engaged with another member that is non rollably positioned thereon, with the second main surface being a surface which is opposite the first main surface,
    bending the at least two elongated steel bars so that they each form ring segments of a ring with a first radius, an inner periphery, and an outer periphery, wherein the first gear structure of each of the at least two elongated steel bars are on the same one of the inner periphery and the outer periphery of the at least two ring segments,
    joining ends of each of the at least two ring segments to each other by means of flash butt welding, in order to form the bearing ring with said first radius.

12. The method of claim 11, further comprising at least one step selected from a group of fabrication steps, the fabrication steps group consisting of:
    forming at least one of the raceway and the first gear structure by a process of rolling, and
    forming at least one of the raceway and the first gear structure by a process of machining.

13. The method of claim 11, according to which the first gear structures are formed to comprise at least one of cogs and helical profiles.

* * * * *